Sept. 29, 1942.   E. C. ALKIRE ET AL   2,296,972
COATED CHART PAPER AND METHOD OF MAKING SAME
Filed April 22, 1940   2 Sheets-Sheet 1

Inventors:
Earl C. Alkire,
Emil F. Blase.
By Brown, Jackson, Boettcher & Dienner,
Attys.

Patented Sept. 29, 1942

2,296,972

UNITED STATES PATENT OFFICE 2,296,972

COATED CHART PAPER AND METHOD OF MAKING SAME

Earl C. Alkire and Emil F. Blase, Springfield, Ill., assignors to Sangamo Electric Company, Springfield, Ill., a corporation of Illinois Application April 22, 1940, Serial No. 330,880

11 Claims. (Cl. 117—21)

The present invention relates generally to coated chart paper for recording meters and the like, on which a record may be made by a stylus or pointer scraping off an outer coating to allow an under surface of contrasting color to show through, and it has particular relation to coated chart paper having a non-waxy outer coating, and to methods of making the same.

The use of recording meters in connection with process control, production studies, sale of such commodities as gas, electricity and water, for recording data on truck and taxi operation, and for recording data in a host of other connections, has rapidly increased in recent years. Generally, the record is made on chart paper either by a line drawn thereon in ink or by scraping off a wax coating to expose a contrasting under surface in the form of a line.

The use of an inking pen is objectionable in many instances, in that frequent inspection, filling and cleaning are required; dust and dirt tend to clog up the pen; ink blotches are frequently made; the ink may freeze or evaporate; and such an ink record cannot be made where the meter is subject to vibration and jarring.

The method of recording by the use of coated chart paper in which a record is made by scraping or rubbing off an outer wax coating by a meter stylus or pointer is not open to the foregoing objections. The meter does not have to be checked frequently, may be used under dusty conditions, and ordinary jarring and vibrations encountered with moving parts and vehicles does not interfere with the record. However, such wax coated charts are open to certain objections. The waxes that are used have relatively low melting points and, in case of excessive temperatures, the charts may either be destroyed or the marking may become obscured. Another serious objection is that in the marking of the charts a considerable quantity of wax is removed which collects into various parts of the meter and often causes serious trouble. Such charts must be stored and handled with great care, as is well known.

Accordingly, an important object of our invention is to provide coated chart paper for use on recording meters and the like having a non-waxy coating to be scraped off by a pointer or stylus to expose an underlying coating of contrasting color.

Another important object of our invention is to make a record on coated chart paper on a recording meter or the like without scraping off a waxy deposit which is likely to be carried into various moving parts of the meter instrument and to impair its operation.

Another important object of our invention is to provide chart paper of the coated type for recording meters and the like on which the record is less easily obliterated or destroyed than records made on the present types of coated chart paper.

Still another important object of our invention is to make chart paper for recording meters and the like capable of withstanding higher temperatures than can the coated chart papers of presently known types.

Another important object of our invention is to provide coated chart paper for recording meters and the like which can be more easily marked than can coated chart papers of the wax type.

Another object of our invention is to provide coated chart paper for recording meters and the like on which very fine record lines may be drawn by a stylus or pointer.

Other objects and advantages of our invention will, in part, be obvious and in part appear hereinafter.

For a more complete understanding of the nature and scope of our invention, reference may be had to the following detailed description, taken in connection with the accompanying drawings, in which.

The basic idea or concept of our invention involved in the manufacture of improved coated chart paper is the application of an amorphous pigment coat, such as India ink, to a highly polished, non-absorbent surface, such as is provided by a high melting point, hard wax or varnish. This requires that the support paper be given two coatings, the first to provide it with a highly polished surface, and the second to give it a marking surface.

Figure 1:
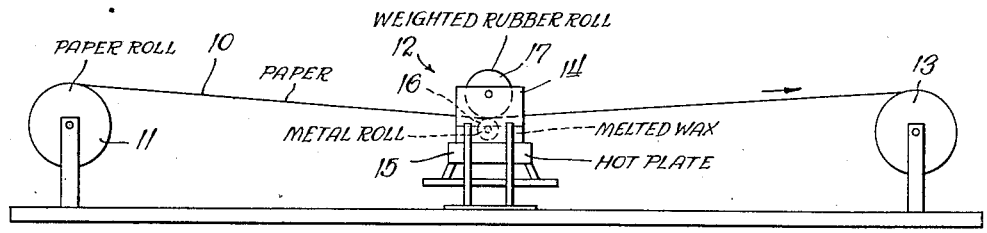
Figures 1 through 4 illustrate diagrammatically one method of making our improved coated chart paper.

Each of the Figures 1, 2, 3 and 4 of the drawings illustrates a separate step in one method of manufacturing our improved paper. Referring now particularly to Figure 1, a continuous paper sheet 10 is shown being unrolled from a paper roll 11 and being pulled through a waxer, indicated generally at 12, to be wound up into a second roll 13. The waxer 12 comprises a tank 14 carried on an adjustably mounted heater or hot plate 15 for maintaining the wax in the tank 14 molten. The paper strip 10 passes through the molten wax in the tank 14 between a metal roll 16 and a weighted rubber roll 17. The weighted rubber roll 17 insures an even coating of the wax on the paper 10. We prefer to use a wax known as carnauba wax having a melting point of about 84° to 86° C. In operation, the temperature of the wax is kept at about 115° to 120° C. and the paper 10 is drawn through at the rate of about 3 feet per minute.

Figure 2:
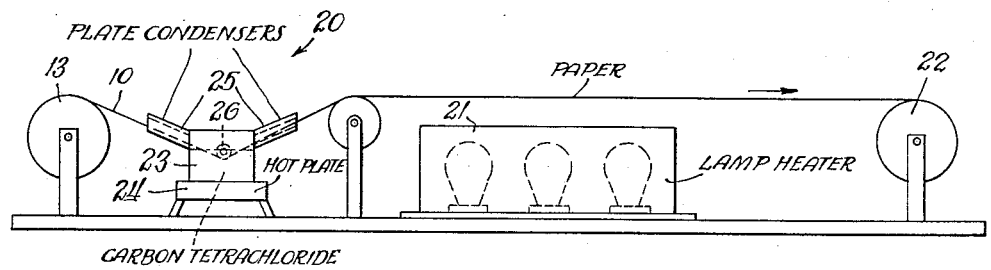

Before the wax coating applied to the paper 10 can be polished, it should be given a surface treatment, as illustrated in Figure 2 of the drawings. As there shown, the coated paper 10 is unrolled from the roll 13 and passed through a carbon tetrachloride bath, indicated generally at 20, and then over a dryer, indicated generally at 21, after which it is wound into a roll 22. The bath 20 comprises a tank 23 heated on a hot plate 24 and provided with inlet and outlet plate condensers 25. The plate condensers 25 prevent loss of carbon tetrachloride. A guide roll 26 is provided in the tank 23 under which the paper sheet 10 passes. The carbon tetrachloride bath is maintained at a temperature of about 25° to 50° C. The dryer 21 may be in the form of a lamp bank heater which serves to evaporate most of the carbon tetrachloride from the paper strip 10. After this carbon tetrachloride treatment, the roll of paper 22 is placed in an oven and baked at a temperature of about 65° to 70° C. for 12 to 18 hours. The purpose of this baking operation is to volatilize any carbon tetrachloride which may remain in the paper. After this baking or drying, the paper 10 is then ready to be polished.

The purpose of the carbon tetrachloride treatment is to obtain a chalky-white appearance on the top of the wax coating, which will polish easily. It has been found that the wax as initially applied will not polish satisfactorily, but when recrystallized by carbon tetrachloride, or other suitable solvent, it polishes readily.

Figure 3:
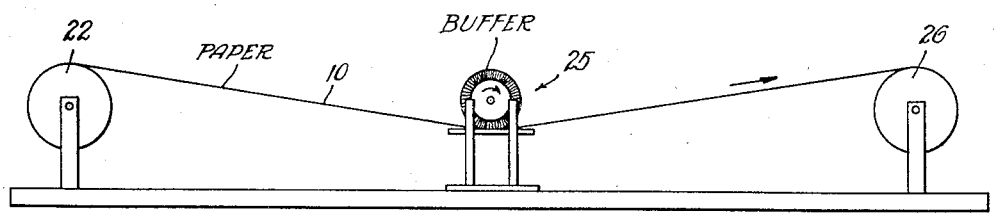

After the carbon tetrachloride treated paper has been baked, it may be polished as illustrated in Figure 3 of the drawings. The paper 10 is unwound from the roll or spool 22, passed through a buffer, indicated generally at 25, and rewound into a roll 26. The buffer 25 may be operated at a speed of 1,800 R. P. M., and the paper strip may be fed therethrough at the rate of 3 feet per minute. Such polishing operation gives the wax coating an excellent high polish and makes it substantially non-absorbent.

Figure 4:
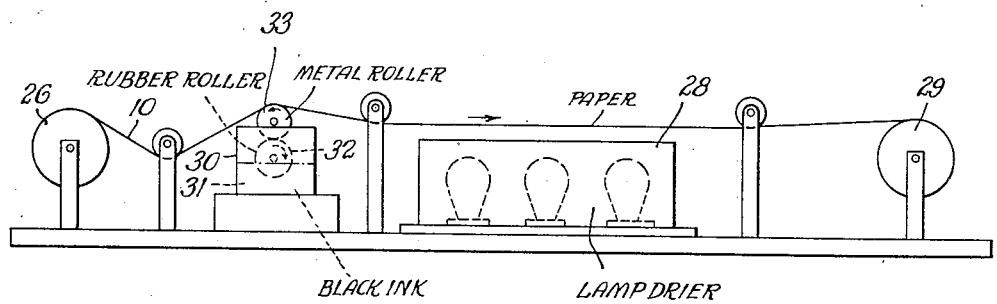

The final step in the process is to give the highly polished wax coated paper 10 an opaque coating. Reference may now be had to Figure 4 of the drawings as illustrative of this coating step. Several different inking solutions may be used for coating the polished waxed paper 10 with an opaque pigment coat which will not dry hard and which will allow a stylus to mark it. One satisfactory inking material which has been used is the commercial product known as Higgins Waterproof Black Ink. This particular ink can be used because, being a water solution or dispersion, it does not bond with the highly polished wax coating in any manner but, because it contains wetting agents, it does spread over the wax coating and wet the surface. Other types of India inks may be used and suitable wetting agents may be added to facilitate the spreading of such ink over the highly polished wax surface. In inking, the highly polished wax coated paper 10 is unwound from the roll 26 and passed over an inker indicated generally at 27, then over a dryer 28, and finally it is wound into a finished roll 29. The inker 27 comprises a tank 30 partially filled with ink 31, and containing a rotatably mounted rubber roller 32 against which a metal inking roller 33 rotates. The metal inking roller 33 deposits a uniform layer or coating of ink on the highly polished wax surface of the paper 10. The ink is then dried by being passed over the dryer 28.

Figure 5:
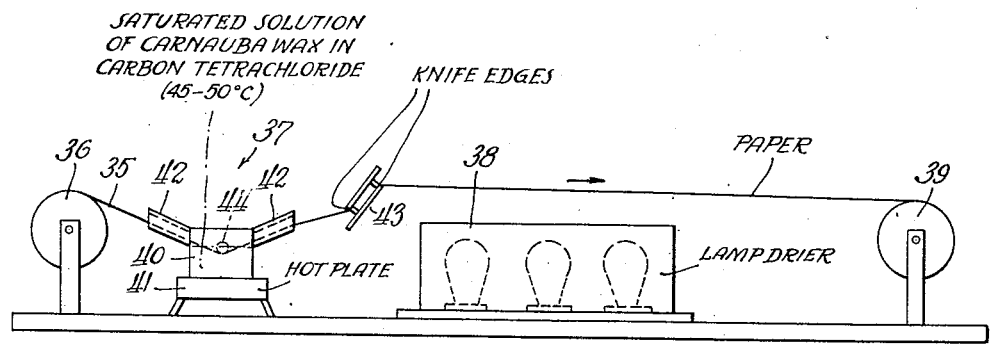
Figure 5 illustrates diagrammatically a modification in the process illustrated in Figures 1 through 4 of the drawings.

With a view of combining the steps illustrated in Figures 1 and 2 of the drawings into one operation, the process illustrated in Figure 5 of the drawings can be used. A sheet of paper 35 is unrolled from a roll of paper 36 and passed through a waxer indicated generally at 37, and then passed over a dryer 38 and rewound into a roll 39. The waxer 37 comprises a tank 40 containing a saturated solution of wax, such as carnauba wax, in carbon tetrachloride, that is heated by a hot plate 41. The tank 40 is provided with inlet and outlet plate condensers 42 to prevent loss of carbon tetrachloride. The saturated solution is kept at a temperature between 45° to 50° C. A set of two knife edges 43 is provided adjacent the outlet plate condenser 42, which serves to scrape both the top and bottom surfaces of the paper sheet 35. The scraper 43 serves to expose the under coating of wax and thereby promotes evaporation of the carbon tetrachloride, so that the wax will crystallize and give the surface its white, chalky appearance which has been found to polish readily. A guide roll 44 may be provided in the tank 40 to guide the paper sheet 35 in passing therethrough.

The paper roll 39 is baked in an oven at 65° to 70° C. for 12 to 18 hours, to rid it of any remaining carbon tetrachloride. The paper is then ready for polishing as outlined in connection with Figure 3 of the drawings.

The wax may be applied in recrystallized form and polished in the same operation, as will now be described in connection with Figure 6 of the drawings. Thus the equivalent of the three separate steps shown in Figures 1, 2 and 3 of the drawings may be obtained in one operation. The wax used in this process should be given a preliminary treatment. The carnauba wax, which is received as a hard yellow mass, is dissolved in carbon tetrachloride to produce a saturated solution at a temperature of about 45° to 50° C. This solution is then allowed to cool and the carbon tetrachloride is evaporated at a lower temperature. The wax crystallizes in a white, chalky form, which has the appearance of "pop-corn." The wax is now in a form which can be easily comminuted into a fine powder.

Figure 6:
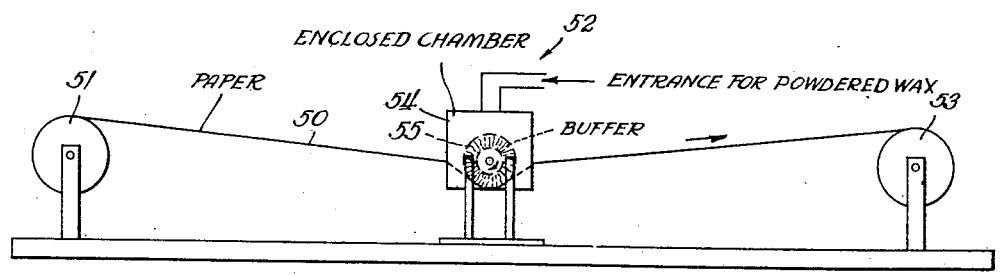
Figure 6 illustrates diagrammatically a still further modification in the process illustrated in Figures 1 through 4 of the drawings.

In operation as shown in Figure 6, a sheet of paper 50 is unrolled from a paper roll 51 and pulled through a waxer, indicated generally at 52, and rewound into a roll 53. The waxer 52 comprises a closed chamber 54 which houses a buffer wheel 55. The fine powdered wax is fed into the chamber 54 and the paper 50 is waxed and polished in the same operation by the buffer 55. The buffer 55 may be driven at a speed of 1800 R. P. M. The paper roll 53, without further treatment, is now ready for inking, according to the procedure described in connection with Figure 4 of the drawings.

Although the carnauba wax appears to be a very satisfactory material, it will be understood that other suitable waxes and equivalent materials may be used in place thereof. Likewise, inks of other colors than black may also be used.

Our new chart paper may be thought of as a "Smoked chart." While the pigment coating applied in the form of an ink dries to a fairly adherent coating, it can be marked more easily than the wax coated chart papers now in use.

This ease in marking is largely due to the highly polished wax surface, which has a very low coefficient of friction to a stylus or pointer such as ordinarily used for marking chart paper. The paper will mark with as little as a 5 gram load on the stylus and requires a pull of from 2½ to 3 grams. With the wax coated charts of the prior art, a 15 gram load on the stylus was necessary which required a pull of from 6½ to 7 grams.

Our improved coated chart paper is much more heat resistant than the ordinary wax coated chart paper. The outer pigment or ink coating is not affected by heat, and the under coating of highly polished wax has a melting point of from 84° to 86° C. Even if this temperature is reached, the record is not lost if already made, and advantage may be taken of this to preserve the record as will hereinafter appear.

The scales are printed on the paper which has been prepared in accordance with the invention as herein disclosed by making a suitable electrotype of the scales and using the same in a conventional form of printing press using whatever color of ink is desired. Where a black and white color scheme is used, the chart can be readily photostated.

The record which has been drawn on a chart that has been prepared according to this invention can be rendered permanent in several ways. This is desirable where the chart is to be kept on hand or filed away for long periods before it is discarded.

One method for preserving the record is to heat the chart slightly above the melting point of the wax. The ink will then be absorbed in the wax and on cooling the record is securely bonded to the paper backing.

Since certain further changes may be made in the foregoing methods of production and materials used, and since different embodiments of the invention may be made without departing from the scope of our invention, it is intended that all matter shown in the accompanying drawings or described hereinbefore shall be interpreted as illustrative, and not in a limiting sense.

We claim:

1. In the method of making coated chart paper the steps which comprise: applying a coating of crystallized carnauba wax to a sheet of paper, polishing the wax coating, and applying a coating of finely divided pigment to the polished wax coating.

2. In the method of making coated chart paper the steps which comprise: passing a sheet of paper through melted carnauba wax to apply a coating of wax thereto, treating the wax coating with a carbon tetrachloride solvent, evaporating the solvent from the wax coated sheet to dry and crystallize the wax surface, polishing the wax coating, passing the sheet through a liquid dispersion of a finely divided pigment, and drying said sheet to remove the dispersion medium and leave a finely divided pigment coating on the polished wax coating.

3. In the method of making coated chart paper the steps which comprise: passing a sheet of paper through melted carnauba wax to apply a coating of said wax thereon, passing the sheet through carbon tetrachloride, evaporating the carbon tetrachloride to leave a recrystallized wax surface, baking the carbon tetrachloride treated sheet, polishing the wax coating, passing the sheet through a bath of India ink, and drying said India ink to leave a finely divided pigment coating on the polished wax surface.

4. In the method of making coated chart paper the steps which comprise: passing a sheet of paper through a carnauba wax solution comprising wax dissolved in an evaporable carbon tetrachloride solvent, drying the solvent to leave a crystallized coating of wax on said sheet, polishing the wax coating, passing the sheet through a liquid dispersion of a finely divided pigment, and drying said sheet to remove the dispersion medium and leave a finely divided pigment coating on the polished wax coating.

5. In the method of making coated chart paper the steps which comprise: passing a sheet of paper through a saturated solution of carnauba wax in carbon tetrachloride, drying the sheet to remove carbon tetrachloride and leave a recrystallized wax surface, baking the sheet to remove final traces of carbon tetrachloride, polishing the wax coating, passing the sheet through a bath of India ink, and drying said India ink to leave a finely divided pigment coating on the polished wax surface.

6. In the method of making a coated chart paper the steps which comprise: crystallizing carnauba wax from a solution thereof, comminuting the crystallized wax, rubbing a sheet of paper with said comminuted crystallized wax to form a polished wax coating thereon, passing the sheet through a liquid dispersion of a finely divided pigment, and drying said sheet to remove the dispersion medium and leave a finely divided pigment coating on the polished wax coating.

7. In the method of making coated chart paper the steps which comprise: dissolving carnauba wax in carbon tetrachloride, evaporating the carbon tetrachloride to crystallize the wax, powdering the crystallized wax, applying the powdered crystallized wax to a sheet of paper by buffer means which produces a high polish on the wax coating, passing the sheet through a bath of India ink, and drying said India ink to leave a finely divided pigment coating on the polished wax surface.

8. Method of preserving a record traced on a chart formed by paper coated with carnauba wax having an inked surface which comprises: heating the chart above the melting point of the wax sufficiently to absorb the ink therein, and allowing the chart to cool to room temperature.

9. Coated chart paper comprising, a paper sheet, a polished crystallized carnauba wax coating on said paper sheet, and a coating of finely divided pigment over said polished wax coating, said pigment being easily rubbed away to allow the wax coat to show through.

10. Coated chart paper for use on recording meters and the like comprising, a paper sheet, a highly polished coating of crystallized carnauba wax on said paper sheet, and a coating of India ink dried on the highly polished wax coating, said India ink coating being easily rubbed away by a stylus to expose the wax coat as a fine line.

11. Coated chart paper for use on recording meters and the like comprising, a highly polished coating of carnauba wax on said paper sheet, the surface of said carnauba wax coating having been crystallized from carbon tetrachloride before polishing, and a coating of black India ink dried on the highly polished wax coating, said black India ink coating being easily removed by a stylus to expose the wax coat as a fine line record.

EARL C. ALKIRE.
EMIL F. BLASE.